United States Patent
Inoue

(10) Patent No.: US 10,230,133 B2
(45) Date of Patent: *Mar. 12, 2019

(54) BATTERY MONITORING APPARATUS

(71) Applicant: DENSO CORPORATION, Kariya, Aichi-pref. (JP)

(72) Inventor: Masahiro Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 293 days.

This patent is subject to a terminal disclaimer.

(21) Appl. No.: 14/974,664

(22) Filed: Dec. 18, 2015

(65) Prior Publication Data

US 2016/0178701 A1    Jun. 23, 2016

(30) Foreign Application Priority Data

Dec. 18, 2014  (JP) ................... 2014-256060

(51) Int. Cl.
| | |
|---|---|
| *G01R 33/02* | (2006.01) |
| *G01R 31/00* | (2006.01) |
| *H01M 10/42* | (2006.01) |
| *H01M 10/30* | (2006.01) |

(52) U.S. Cl.
CPC .......... *H01M 10/425* (2013.01); *H01M 10/30* (2013.01); *H01M 2010/4271* (2013.01)

(58) Field of Classification Search
CPC ....... H01M 10/425; H01M 2010/4271; H01M 10/30
USPC .................... 324/252, 426, 750.3
See application file for complete search history.

(56) References Cited

U.S. PATENT DOCUMENTS

2011/0119005 A1*  5/2011  Majima .............. G01R 31/361
                                                                            702/63

FOREIGN PATENT DOCUMENTS

| JP | 2002-281681 A | 9/2002 |
| JP | 2002-315212 A | 10/2002 |
| JP | 2010-035337 A | 2/2010 |

OTHER PUBLICATIONS

Jan. 19, 2018 Office Action issued in U.S. Appl. No. 14/974,970.
U.S. Appl. No. 14/974,970, filed Dec. 18, 2015 in the name of Inoue et al.

* cited by examiner

*Primary Examiner* — Farhana Hoque
(74) *Attorney, Agent, or Firm* — Oliff PLC

(57) ABSTRACT

A battery monitoring apparatus monitors a state of a nickel hydrogen battery. The apparatus includes a board having a high voltage part having a voltage detection section detecting a voltage of the nickel hydrogen battery, and a low voltage part operating at voltage lower than voltage of the high voltage part, a housing that accommodates the board, and an attachment member that is attached to an opposed portion of the housing, which is opposed to a board surface of the board to attach the housing to a predetermined position. A passage is formed between the opposed portion and the attachment member. The passage extends from an opening part provided at a circumference part of the housing and along the opposed portion. The passage is located at a position that overlaps with the low voltage part, when viewed in a normal direction of the board surface.

6 Claims, 5 Drawing Sheets

TO UPPER ECU

BATTERY MONITORING APPARATUS

CROSS-REFERENCE TO RELATED APPLICATION

This application is based on and claims the benefit of priority from earlier Japanese Patent Application No. 2014-256060 filed Dec. 18, 2014, the description of which is incorporated herein by reference.

BACKGROUND

Technical Field

The present invention relates to a battery monitoring apparatus, in particular, a battery monitoring apparatus that monitors a state of a nickel hydrogen battery.

Related Art

As a secondary battery for a vehicle in which the driving force is generated by an electric motor, a nickel hydrogen battery is known. The nickel hydrogen battery has a negative electrode made of a hydrogen storing alloy and a positive electrode made of a nickel compound such as nickel hydroxide. The nickel hydrogen battery is usually incorporated in a vehicle as an assembled battery in which a plurality of cells are connected in series to increase the output voltage. In the vehicle incorporating such a nickel hydrogen battery is generally equipped with a battery monitoring apparatus for monitoring a state of the battery (e.g. refer to JP-A-2002-315212). In the nickel hydrogen battery, the cells are generally grouped into blocks. The battery monitoring apparatus detects a voltage of each of the blocks to monitor the voltage of the assembled battery.

A battery monitoring apparatus for a nickel hydrogen battery is known in which a circuit board, on which electronic components are mounted, is accommodated in a housing. The circuit board is provided with a high-voltage part having a voltage detection circuit for detecting a voltage of an assembled battery, and a low-voltage part having a low-voltage circuit that operates at voltage lower than that of the high-voltage part. The low-voltage part has a function, for example, of outputting a signal corresponding to the detection voltage of the voltage detection circuit to an upper ECU (e.g. hybrid ECU).

When an abnormity is caused in the assembled battery or the voltage detection circuit, the low-voltage part outputs information on the abnormity of the high-voltage part to the upper ECU. Thereby, the abnormity can be detected by the upper ECU. In this case, when an abnormity such as a fault of the voltage detection circuit due to a short circuit is caused, the temperature of the high-voltage part may be higher than usual. If such an abnormity is caused, it is required that the low-voltage part is protected from the high-voltage part whose temperature has become higher. Specifically, the state of the nickel hydrogen battery is often monitored in block voltage. Hence, in the battery monitoring apparatus, the temperature of the high-voltage part easily becomes higher.

SUMMARY

An embodiment provides a battery monitoring apparatus that can prevent a malfunction of a low voltage part due to heat.

As an aspect of the embodiment, a battery monitoring apparatus is provided which monitors a state of a nickel hydrogen battery. The apparatus includes: a board having a high voltage part having a voltage detection section detecting a voltage of the nickel hydrogen battery, and a low voltage part operating at voltage lower than voltage of the high voltage part; a housing that accommodates the board; and an attachment member that is attached to an opposed portion of the housing, which is opposed to a board surface of the board to attach the housing to a predetermined position. A passage is formed between the opposed portion and the attachment member, the passage extending from an opening part provided at a circumference part of the housing and along the opposed portion, and the passage being located at a position that overlaps with the low voltage part, when viewed in a normal direction of the board surface.

DETAILED DESCRIPTION OF THE PREFERRED EMBODIMENTS

With reference to the accompanying drawings, hereinafter are described some embodiments of the present invention.

Figure 1:
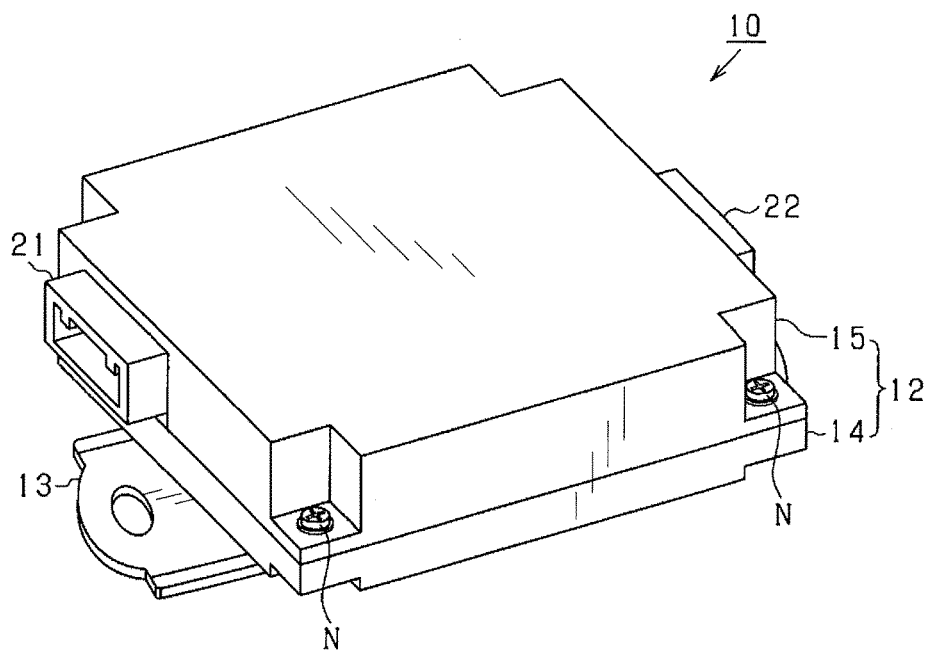
FIG. 1 is a perspective view showing a general schematic configuration of a battery monitoring apparatus.
Figure 2:
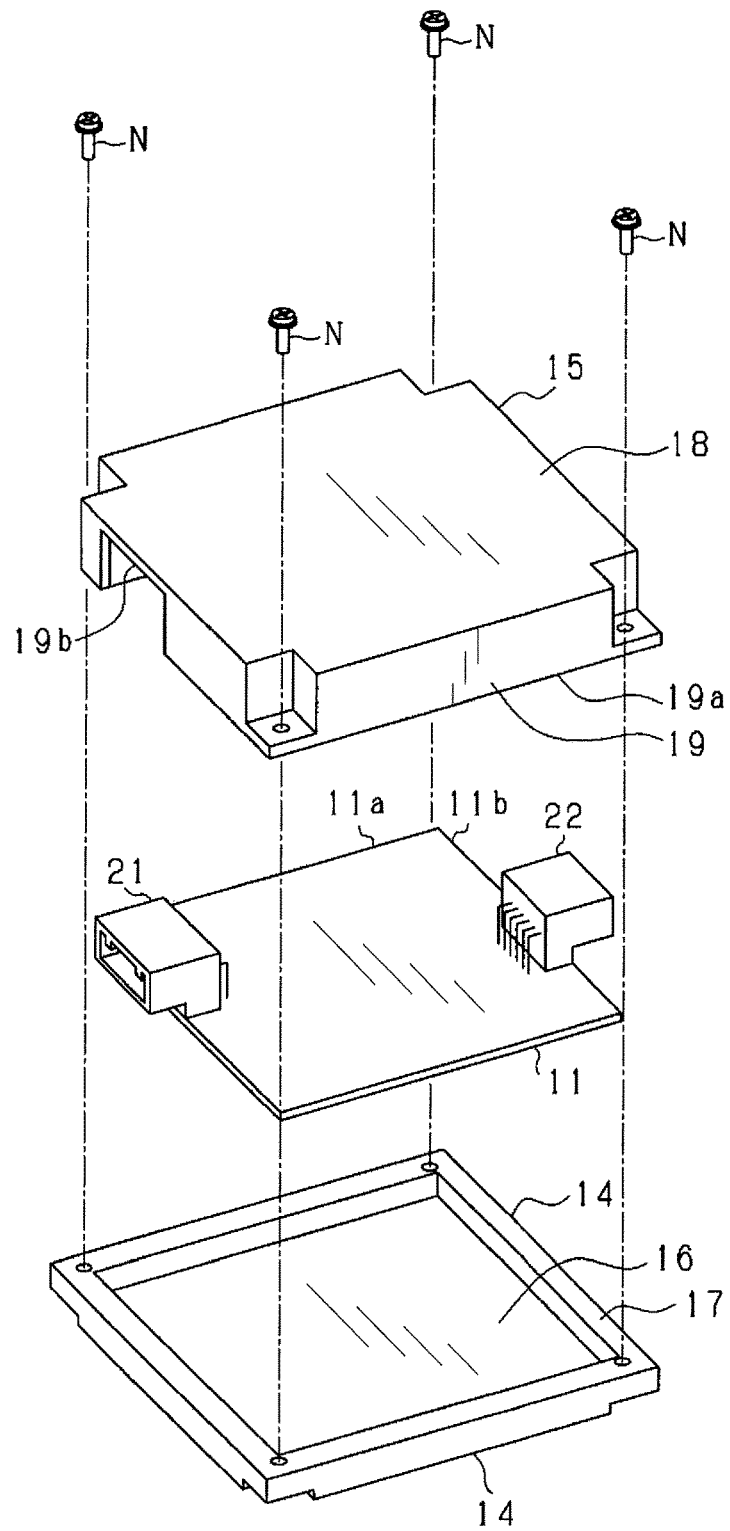
FIG. 2 is an exploded perspective view showing an exploded housing.

In the present embodiment, a battery monitoring apparatus is embodied which monitors a state of an in-vehicle high-voltage battery serving as a power source of a vehicle. In the present embodiment, the in-vehicle high-voltage battery is a nickel hydrogen battery, and is configured as an assembled battery including a series connection of a plurality of cells A schematic configuration of the battery monitoring apparatus of the present embodiment is described with reference to FIG. 1 and FIG. 2. FIG. 1 is a perspective view showing a general schematic configuration of the battery monitoring apparatus. FIG. 2 is an exploded perspective view showing a partial configuration of the battery monitoring apparatus. As shown in FIG. 1 and FIG. 2, the battery monitoring apparatus 10 includes a board 11, a housing 12 accommodating the board 11, and a bracket 13 serving as an attachment member. Note that, in the following explanation, the vertical direction of the battery monitoring apparatus 10 is defined with reference to FIG. 1 showing a state where the battery monitoring apparatus 10 is placed on a horizon plane, for the sake of convenience.

The housing 12 is a vertically separable case including a base 14 and a cover 15, and is made of a metallic material such as aluminum. The base 14 includes a substantially quadrangular bottom plate part 16, and a standing wall 17 standing from the bottom plate part 16. The top surface of the bottom plate part 16 is a board mounting part on which the board 11 is mounted. In a state where the board 11 is mounted, the board 11 is surrounded by the standing wall 17.

The cover 15 includes a top board 18 that covers the board 11 from above, and a hanging wall 19 extending downward from the top board 18. The top board 18 has a substantially quadrangle shape. The hanging wall 19 surrounds the circumference part of the top board 18. On two of side surfaces provided on four sides of the top board 18, an end portion 19a, which is one part of the hanging wall 19, contacts a base 14, and an end portion 19b, which is the other part of the hanging wall 19, is apart from the base 14. From the gap between the end portion 19b of the hanging wall 19 and the base 14, a high-voltage side connector 21 and a low-voltage side connector 22 are exposed outside. The high-voltage side connector 21 is electrically connected to an in-vehicle high-voltage battery. The low-voltage side connector 22 is electrically connected to an in-vehicle upper ECU (e.g. hybrid ECU), which receives outputs of the battery monitoring apparatus 10.

Circumference parts of the base 14 and the cover 15 are each provided with a plurality of screw holes. The cover 15 is mounted on the base 14 and is fixed to the base 14 by fixing screws N. Note that the base 14 and the cover 15 may be made of synthetic resin such as polypropylene.

The board 11 is a rectangular printed circuit board, and has a board surface 11a on which a predetermined circuit pattern is formed. In addition, various components such as the high-voltage side connector 21, the low-voltage side connector 22, and electronic components are mounted on the board surface 11a.

Figure 3:
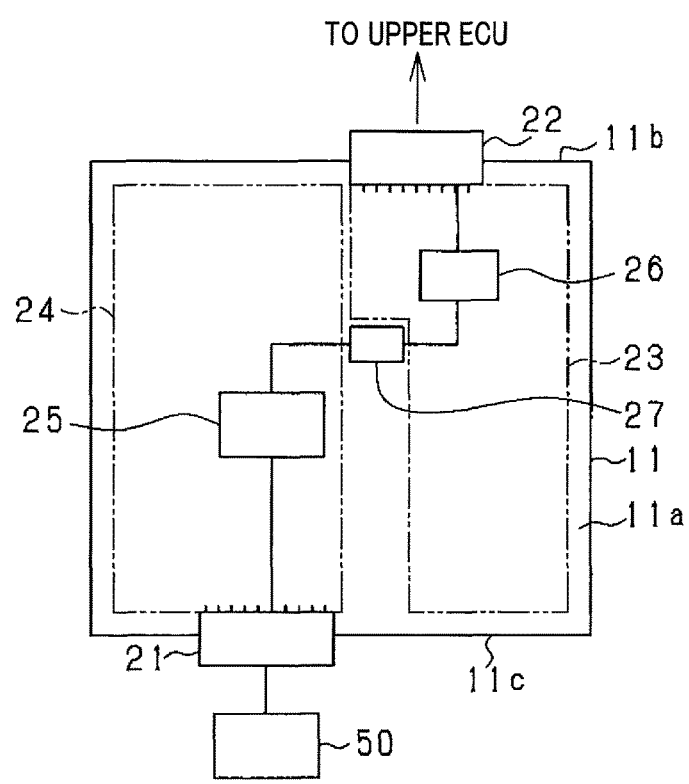
FIG. 3 is a plan view of a board.

The board 11 is described with reference to FIG. 3. As shown in FIG. 3, the board 11 has a high voltage part 24 and a low voltage part 23. The high voltage part 24 is connected to an assembled battery 50 serving as an in-vehicle high-voltage battery. The low voltage part 23 operates at voltage lower than that at which the high voltage part 24 operates. The low voltage part 23 is an area where the housing 12 is a reference of the potential. The high voltage part 24 is an area where the reference potential is higher than that of the low voltage part 23. In the present embodiment, the reference potential of the high voltage part 24 is set to a median between the potential at the positive terminal of the assembled battery 50 and the potential at the negative terminal of the assembled battery 50. The high voltage part 24 and the low voltage part 23 are arranged in an area where the high voltage part 24 and the low voltage part 23 are not overlapped with each other when viewed in the normal direction of the board surface 11a, and on the same surface of the board.

In the high voltage part 24, a voltage detection section 25 is provided which detects a voltage of the assembled battery 50. The voltage detection section 25 is configured by, for example, an operational amplifier. In the high voltage part 24, the high-voltage side connector 21 is placed at a position corresponding to the circumference part of the board 11. The voltage detection section 25 is electrically connected to the assembled battery 50 via the high-voltage side connector 21. The voltage detection section 25 detects a voltage across the terminals of the cells and outputs a signal corresponding to the detected voltage across the terminals to the low voltage part 23. Specifically, the assembled battery 50 of the present embodiment is configured by a plurality of battery blocks, each of which is a group having a predetermined number of cells, each of which is a minimum unit for discharge and charge. The voltage detection section 25 detects a voltage (block voltage) of each of the battery blocks by using, for example, a flying capacitor system to determine whether or not the cells are in a state of overcharge or over discharge. Note that the voltage detection section 25 may be an integrated circuit.

In the low voltage part 23, a control section 26 is provided. The control section 26 is configured as an integrated circuit. The control section 26 is electrically connected to the voltage detection section 25 of the high voltage part 24 via an insulating part 27 such as a photocoupler. Note that the insulating part 27 is an insulating member for electrically insulating the high voltage part 24 and the low voltage part 23 from each other. At a position of the low voltage part 23 which is part of the circumference part of the board 11, a low-voltage side connector 22 is placed. The control section 26 is electrically connected to the upper ECU via the low-voltage side connector 22. The control section 26 receives a signal (voltage detection signal) corresponding to the detection voltage of the voltage detection section 25, and outputs the received voltage detection signal to the upper ECU via the low-voltage side connector 22. Note that, although not shown, various electronic components are mounted on the board 11 in addition to the voltage detection section 25, the insulating part 27, and the control section 26.

The high voltage part 24 and the low voltage part 23 are arranged in the direction along a side 11b (hereinafter, referred to as low-voltage side connector placement side 11b), on which the low-voltage side connector 22 is placed, and which is one of the four sides surrounding the board surface 11a. Also, the high-voltage side connector 21 is placed on a side 11c opposed to the low-voltage side connector placement side 11b.

Figure 4:
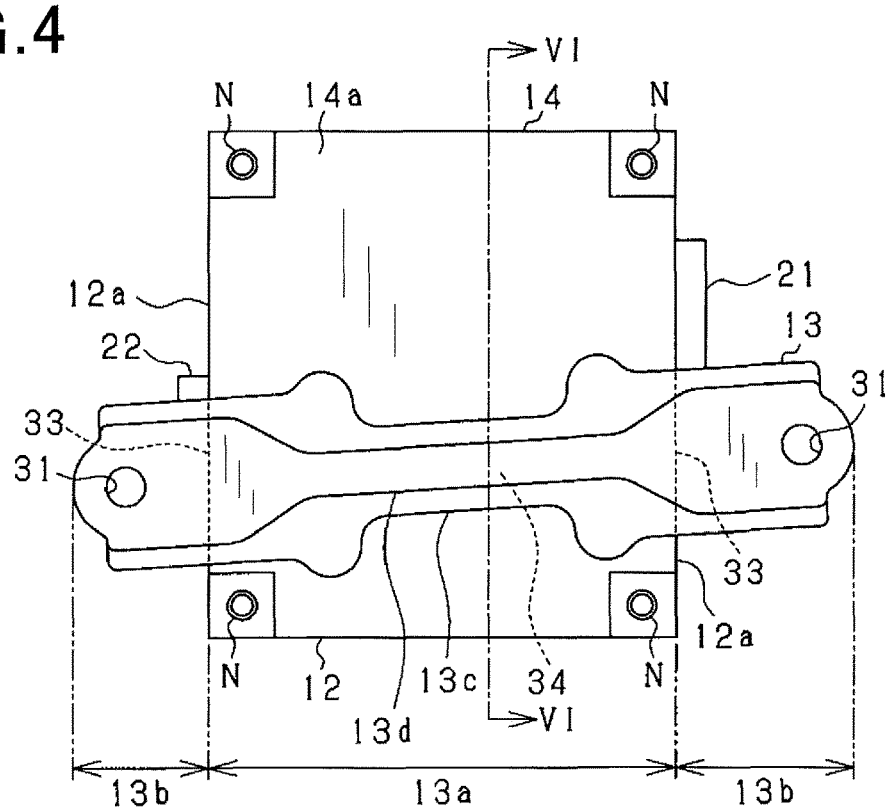
FIG. 4 is a bottom view of the battery monitoring apparatus.
Figure 5:
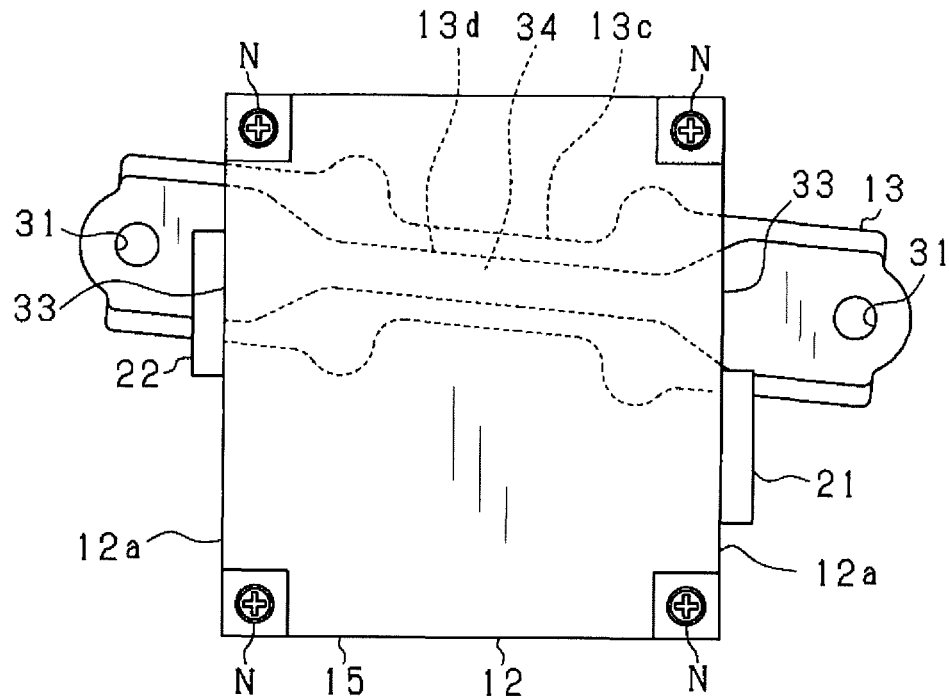
FIG. 5 is a top view of the battery monitoring apparatus.
Figure 6:
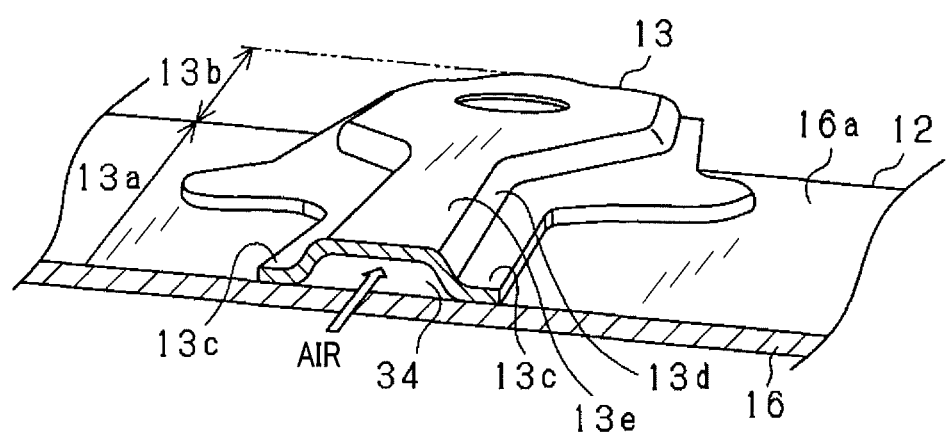
FIG. 6 is a sectional view of a bracket.
Figure 7:
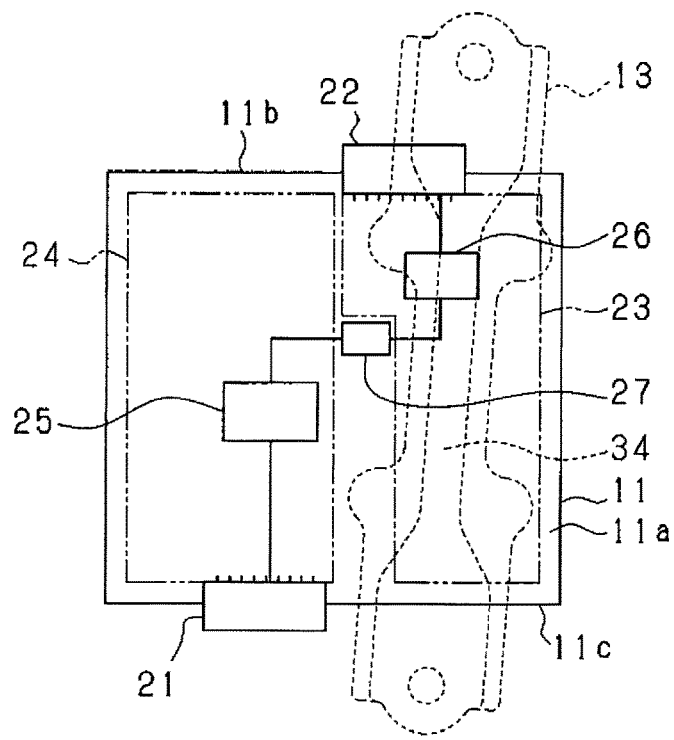
FIG. 7 is a diagram showing a position of the bracket viewed in the normal direction of a board surface.

Next, the bracket 13 is described in detail with reference to FIG. 4 to FIG. 7. FIG. 4 is a bottom view of the battery monitoring apparatus 10. FIG. 5 is a top view of the battery monitoring apparatus 10. FIG. 6 is a sectional view cut along the line VI-VI of FIG. 4. FIG. 7 is a diagram showing a position of the bracket 13 viewed in the normal direction of the board surface 11a.

The bracket 13 is an attachment member for attaching the housing 12 to a predetermined position of a vehicle, and is made of metallic material such as aluminium. The bracket 13 has an elongated shape. Each of the both end portions of the bracket 13, which are positioned in the longitudinal direction of the bracket 13, are provided with a hole part 31. Inserting fixing screws into the hole parts 31 fixes the housing 12 to a predetermined position of the vehicle side. Note that the bracket 13 may be formed of synthetic resin such as polypropylene.

The bracket 13 is attached to an outer surface 16a of the bottom plate part 16, which is an opposed portion opposed to the board surface 11a, of the housing 12 by welding, screw fastening, adhesion or the like. The bracket 13 has a length in the longitudinal direction longer than the length of the side of the bottom plate part 16 extending in the direction same as the direction in which the bracket 13 extends. Specifically, as shown in FIG. 4, the bracket 13 has an overlapped part 13a and protrusion parts 13b. The overlapped part 13a is opposed to and overlaps with the housing 12 in a state where the overlapped part 13a is attached to the bottom plate part 16. The protrusion parts 13b protrude from the housing 12. Each of the protrusion parts 13b is provided with a hole part 31. The battery monitoring apparatus 10 is attached to a predetermined position of the vehicle with reference to the hole parts 31.

More specifically, as shown in FIG. 6, the bracket 13 has fixing parts 13c and a convex part 13d. The fixing parts 13c are provide in the overlapped part 13a and are fixed to the outer surface 16a of the bottom plate part 16 of the housing 12. The convex part 13d laterally protrudes from the outer surface 16a of the bottom plate part 16. The fixing parts 13c are provided at both sides of the convex part 13d in the direction perpendicular to the longitudinal direction of the bracket 13 so as to put the convex part 13d between the fixing parts 13c. The bracket 13 is attached to the housing 12 by fixing the fixing parts 13c to the outer surface 16a of the bottom plate part 16. In addition, as shown in FIG. 6, in the above attachment state, a clearance space is formed (provided) between the bottom plate part 16 and the convex part 13d.

The clearance space extends from one end portion to the other end portion of the convex part 13 and in the longitudinal direction of the convex part 13. Opening parts 33 are formed at circumference parts 12a of the housing 12 as ports of the clearance space between the bottom plate part 16 and the convex part 13d. A passage 34 is formed by the clearance space extending from the opening part 33 and along the bottom plate part 16 to function as a ventilation passage. In addition, the opening parts 33 are formed at boundaries between the overlapped part 13a and the protrusion parts 13b.

The convex part 13d has a flat part 13e extending parallel to the bottom plate part 16. In a state where the battery monitoring apparatus 10 is fixed to a predetermined position of the vehicle, at least part of the flat part 13e is brought into contact with the vehicle side. In addition, the passage 34 has a flattened shape having a predetermined height (e.g. several millimeters) due to the convex part 13d. Note that the cross-sectional shape of the bracket 13 is not limited to the flattened shape shown in FIG. 6, but may be, for example, a circular shape or a V shape.

In a state where the battery monitoring apparatus 10 is attached to the vehicle side via the bracket 13, the housing 12 is apart from an attachment part of the vehicle side. That is, a gap is provided between the vehicle side and the housing 12. In the present embodiment, since the passage 34 is formed in the longitudinal direction of the bracket 13 and between the housing 12 and the bracket 13, the direction in which air flows can be restricted. Hence, the ventilation can be provided in a desired direction. In addition, in a state where the battery monitoring apparatus 10 is attached to the vehicle, the convex part 13d (flat part 13e) of the bracket 13 serves as an attachment surface to the vehicle. Since the convex part 13d is wide, the battery monitoring apparatus 10 is stably attached.

In addition, the width of the convex part 13d varies when viewed in the longitudinal direction of the bracket 13. Specifically, in the bracket 13, the widths of the opening parts 33 positioned at the circumference parts 12a of the housing 12 differ from the width of the central portion, and the widths of the opening parts 33 are larger than the width of the central portion. Hence, air easily flows into the opening part 33, which is an inlet port of ventilation to the passage 34. In addition, according to the configuration, the air flow velocity in the vicinity of the center of the bottom plate part 16 can be higher. Next, the arrangement of the bracket 13 is described. As shown in FIG. 7, the bracket 13 is positioned at a position where the passage 34 formed between the bracket 13 and the housing 12 overlaps with the low voltage part 23 viewed in the normal direction of the board surface 11a.

Specifically, as shown in FIG. 7, the bracket 13 is placed so as to cross the low-voltage side connector placement side 11b and the side 11c opposed to the low-voltage side connector placement side 11b, when viewed in the normal direction of the board surface 11a. The bracket 13 is attached so that the passage 34 overlaps with only the low voltage part 23 when viewed in the normal direction of the board surface 11a. In the present embodiment, the bracket 13 is attached so that the passage 34 overlaps with the control section 26.

A system, which detects block voltages to monitor the voltage of the assembled battery 50, is required to monitor high voltage compared with a system that detects a voltage of each cell to monitor the voltage of the assembled battery 50. Hence, the high voltage part 24 easily becomes high in temperature. When the high voltage part 24 is excessively high in temperature, there is a concern that the low voltage part 23 may decrease in function due to the influence of heat. Specifically, the control section 26 may not be able to output various pieces of information to the upper ECU. In this regard, according to the battery monitoring apparatus 10 of the present embodiment, since the passage 34 formed in the longitudinal direction of the bracket 13 serves as a ventilation path, a flow of air can be produced below the low voltage part 23. Hence, even when the high voltage part 24 becomes excessively high in temperature, the flow of air in the passage 34 can promote the heat radiation from the low voltage part 23, which communicates with the upper ECU.

According to the present embodiment described above, the following advantages can be provided.

The passage 34 is formed which extends between the bracket 13 and the bottom plate part 16 of the housing 12 and along the bottom plate part 16 from the opening part 33 provided at the circumference part of the housing 12 to the bottom plate part 16 of the housing 12. In addition, the bracket 13 is placed so that the passage 34 overlaps with the low voltage part 23 when viewed in the normal direction of the board surface 11a. According to the configuration, the passage 34 serves as a ventilation path. Hence, when the high voltage part 24 is excessively high in temperature, the flow of air in the passage 34 can preferentially and intensively draw heat from the low voltage part 23, which communicates with the upper ECU. In addition, such promotion of the heat radiation can prevent a malfunction of the low voltage part 23. As a result, even when the high voltage part 24 is abnormal, power performance and evacuation travel performance of the vehicle can be prevented from lowering. Hence, the user can safely stop the vehicle.

In addition, the high voltage part 24 and the low voltage part 23 are connected via the insulating part 27. When the high voltage part 24 is excessively high in temperature, controlling the operation of the insulating part 27 can separate the high voltage part 24 from the low voltage part 23. Such separation of the high voltage part 24 and the promotion of the heat radiation from the low voltage part 23 using the passage 34 formed between the bracket 13 and the housing 12 can protect the low voltage part 23 from heat. In addition, information can be communicated to the upper CPU.

The bracket 13 has the overlapped part 13a, which is opposed to and overlaps with the housing 12 in a state where the bracket 13 is attached to the bottom plate part 16, and the protrusion parts 13b protruding from the housing 12. In the bracket 13, the opening parts 33 are formed at boundaries between the overlapped part 13a and the protrusion parts 13b. The air flowing around the battery monitoring apparatus 10 flows along the protrusion part 13b of the bracket 13, and flows into the passage 34 through the opening part 33 positioned at the boundary between the protrusion part 13b and the overlapped part 13a. Hence, a configuration can be realized which easily introduces air into the passage 34.

The high voltage part 24 and the low voltage part 23 are arranged in the direction along the low-voltage side connector placement side 11b, which is one of the four sides forming the board surface 11a. The bracket 13 is placed so as to cross the low-voltage side connector placement side 11b and the side 11c opposed to the low-voltage side connector placement side 11b. When the low-voltage side connector 22 is provided on a side surface of the housing 12, the flow of air passing through the gap between the low-voltage side connector 22 and the housing 12 is easily generated. In this case, the above configuration easily introduces air into the passage 34.

In the present embodiment, the high-voltage side connector 21 is provided on the side 11c opposed to the low-voltage side connector placement side 11b. The bracket 13 is placed so as to cross the low-voltage side connector placement side 11b and the high-voltage side connector placement side 11c. When two connectors are arranged on the side surfaces of the housing 12 so as to be opposed to each other, the flow of air passing from the gap between one of the connectors and the housing 12 to the gap between the other of the connectors and the housing 12 is easily generated. In this case, the above configuration easily introduces air into the passage 34.

The bracket 13 has the fixing parts 13c, which is fixed to the outer surface 16a of the bottom plate part 16 of the housing 12 in the overlapped part 13a, and the convex part 13d, which laterally protrudes from the outer surface 16a of the bottom plate part 16. According to the configuration, the passage 34 can be formed between the bracket 13 and the outer surface of the bottom plate part 16 without complicating the structure of the housing 12.

The flat part 13e of the bracket 13 can stably attach the battery monitoring apparatus 10 to the vehicle side by the flat part 13e. In addition, since the cross-sectional shape of the passage 34 is a flattened shape, the cross-sectional area of the passage for ventilation can be ensured without excessively making larger the distance (dead space) from the vehicle side to the housing 12.

The bracket 13 is expected to function as a heat radiation part radiating heat by heat transfer. That is, placing the bracket 13 at the position where the bracket 13 overlaps with the low voltage part 23 in a planar view can radiate the heat in the low voltage part 23 to the vehicle side (vehicle body) via the bracket 13.

Other Embodiments

It will be appreciated that the present invention is not limited to the configurations described above, but any and all modifications, variations or equivalents, which may occur to those who are skilled in the art, should be considered to fall within the scope of the present invention.

In the above embodiment, as shown in FIG. 7, the high-voltage side connector 21 is placed on the side 11c opposed to the low-voltage side connector placement side 11b. The position where the high-voltage side connector 21 is attached is not particularly limited with respect to the position where the low-voltage side connector 22 is attached. For example, the high-voltage side connector 21 may be attached on the side perpendicular to the low-voltage side connector placement side 11b on the circumference part of the high voltage part 24. Alternatively, the high-voltage side connector 21 may be attached on the same side as the low-voltage side connector placement side 11b.

In the above embodiment, the high-voltage side connector 21 is placed on the side 11c opposed to the low-voltage side connector placement side 11b. The bracket 13 is placed so as to cross the low-voltage side connector placement side 11b and the high-voltage side connector placement side 11c when viewed in the normal direction of the board surface 11a. However, the bracket 13 may be placed so as to cross the low-voltage side connector placement side 11b and the side on which the high-voltage side connector 21 and the low-voltage side connector 22 are not placed.

Figure 8:
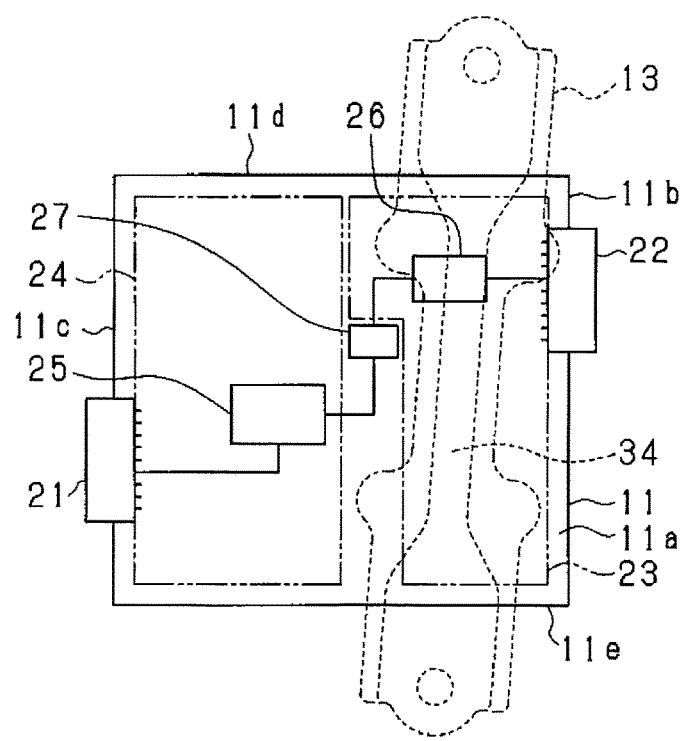
FIG. 8 is a diagram showing a position of a bracket of another embodiment.

The placement of the bracket 13 to the board surface 11a is not limited to the above embodiment. For example, as shown in FIG. 8, in a state where the high voltage part 24 and the low voltage part 23 are arranged in the direction crossing the low-voltage side connector placement side 11b of the four sides surrounding the board surface 11a, the bracket 13 is placed so as to cross the opposed two sides 11d and 11e on which the low-voltage side connector 22 and the high-voltage side connector 21 are not provided. Note that, in FIG. 8, the high-voltage side connector 21 is placed on the side 11c opposed to the low-voltage side connector placement side 11b. When two connectors are placed so as to be opposed to each other on the side surfaces of the housing 12, the flow of air passing from the gap between one of the connectors and the housing 12 to the gap between the other of the connectors and the housing 12 is easily generated. In such a configuration, placing the bracket 13 so as to cross the two sides 11d and 11e can promote the flow of air in the direction crossing the direction in which the low-voltage side connector 22 and the high-voltage side connector 21 are arranged.

In the above embodiment, providing the convex part 13d to the bracket 13 provides the passage 34 in a clearance space between the bracket 13 and bottom plate part 16 of the housing 12. However, a concave part may be provided in the bottom plate part 16 and at the position that overlaps with the low voltage part 23 when viewed in the normal direction of the board surface 11a, and the bracket 13 may be attached at the position that overlaps with the concave part, to provide the passage 34 between the bracket 13 and the housing 12. In this case, as in the case of the above embodiment, the bracket 13 may have the fixing parts 13c and the convex part 13d, or may have a flat plate shape.

In the above embodiment, the bracket 13 serving as an attachment member is configured by one component. However, the bracket 13 may be configured by two or more components. For example, when two brackets 13 are attached to the battery monitoring apparatus 10, the two brackets 13, which are provided by cutting off an intermediate part in the longitudinal direction of the bracket 13 shown in FIG. 4, may be attached to the housing 12.

In the above embodiment, the bracket 13 is attached to the bottom plate part 16 of the base 14 of the housing 12. However, the bracket 13 may be attached to the top board 18 of the cover 15.

The passage 34 in a planar view of the bottom plate part 16 of the housing 12 may have a straight shape extending along the bottom plate part 16 or a curved shape. The bracket 13 may have a branched shape. According to this, the passage 34 may have a branched shape.

In the above embodiment, one board 11 having the high voltage part 24 and the low voltage part 23 is accommodated in the housing 12. However, two or more boards 11 may be accommodated in the housing 12, one of the boards 11 having the high voltage part 24, and another of the boards 11 having the low voltage part 23. Note that the board having the high voltage part 24 and the board having the low voltage part 23 are arranged so that at least part of the high voltage part 24 and at least part of the low voltage part 23 are not overlapped with each other, when viewed in the normal direction of the board surface 11a. The bracket 13 is attached so as to overlap with only the low voltage part 23 in a planar view of the board surface 11a.

In the above embodiment, although the battery monitoring apparatus 10 is applied to a nickel hydrogen battery incorporated in a vehicle, the battery monitoring apparatus 10 may be applied to a nickel hydrogen battery used for an object other than the vehicle (e.g. electrical equipment).

Hereinafter, aspects of the above-described embodiments will be summarized.

As an aspect of the embodiment, a battery monitoring apparatus (10) is provided which monitors a state of a nickel hydrogen battery (50). The apparatus includes: a board (11) having a high voltage part (24) having a voltage detection section (25) detecting a voltage of the nickel hydrogen battery, and a low voltage part (23) operating at voltage lower than voltage of the high voltage part; a housing (12) that accommodates the board; and an attachment member (13) that is attached to an opposed portion (16) the housing, which is opposed to a board surface (11a) of the board to attach the housing to a predetermined position. A passage (34) is formed between the opposed portion and the attachment member, the passage extending from an opening part (33) provided at a circumference part of the housing and along the opposed portion, and the passage being located at a position that overlaps with the low voltage part, when viewed in a normal direction of the board surface.

In the battery monitoring apparatus, the passage is formed which extends between the attachment member and the housing and along the opposed portion of the housing side from the opening part provided at the circumference part of the housing. In addition, the attachment member is placed so that the passage overlaps with the low voltage part, when viewed in the normal direction of the board surface. According to the configuration, the passage provided between the attachment member and the housing serves as a ventilation path. Hence, when the high voltage part is excessively high in temperature, the flow of air in the passage can preferentially and intensively draw heat from the low voltage part. In addition, such promotion of the heat radiation can prevent a malfunction of the low voltage part.

What is claimed is:

1. A battery monitoring apparatus that monitors a state of a nickel hydrogen battery, the apparatus comprising:
    a board having a high voltage part having a voltage detection section detecting a voltage of the nickel hydrogen battery, and a low voltage part operating at voltage lower than voltage of the high voltage part;
    a housing that accommodates the board; and
    an attachment member that is attached to an opposed portion of the housing, which is opposed to a board surface of the board to attach the housing to a predetermined position, wherein
    a passage is formed between the opposed portion and the attachment member, the passage extending from an opening part provided at a circumference part of the housing and along the opposed portion, and the passage being located at a position that overlaps with the low voltage part, when viewed in a normal direction of the board surface.

2. The battery monitoring apparatus according to claim 1, wherein
    the fixing member has an overlapped part that is opposed to and overlaps with the housing in a state where the attachment member is attached to the opposed portion, and a protrusion part that protrudes from the housing, and
    the opening part is formed at a boundary between the overlapped part and the protrusion part.

3. The battery monitoring apparatus according to claim 1, wherein
    the board has a rectangular shape,
    a low-voltage side connector is placed on the board and at a position corresponding to a circumference part of the board in the low voltage part, the low-voltage side connector electrically connecting the low voltage part and a unit that receives an output of the battery monitoring apparatus,
    the high voltage part and the low voltage part are arranged in a direction along a connector placement side, on which the low-voltage side connector is provided, of the board surface, and
    the attachment member is placed so as to cross the connector placement side and a side opposed to the connector placement side, when viewed in a normal direction of the board surface.

4. The battery monitoring apparatus according to claim 3, wherein
    a high-voltage side connector is placed on the board and at a position corresponding to a circumference part of the board in the high voltage part, the high-voltage side connector electrically connecting the nickel hydrogen battery and the high voltage part, and
    the high-voltage side connector is provided on a side opposed to the connector placement side of the board surface.

5. The battery monitoring apparatus according to claim 1, wherein
    the board has a rectangular shape,
    a low-voltage side connector is placed on the board and at a position corresponding to a circumference part of the board in the low voltage part, the low-voltage side connector electrically connecting the low voltage part and a unit that receives an output of the battery monitoring apparatus, and a high-voltage side connector is placed on the board and at a position corresponding to a circumference part of the board in the high voltage part, the high-voltage side connector electrically connecting the nickel hydrogen battery and the high voltage part,
    the high voltage part and the low voltage part are arranged on the board surface and in a direction crossing a connector placement side, on which the low-voltage side connector is placed,
    the high-voltage side connector is provided on the board surface and on a side opposed to the connector placement side, and
    the attachment member is placed so as to cross two sides different from the connector placement side and the side opposed to the connector placement side, when viewed in a normal direction of the board surface.

6. The battery monitoring apparatus according to claim 1, wherein
    the attachment member has a fixing part, which is fixed to the opposed portion in an overlapped part that is opposed to and overlaps with the housing in a state where the attachment member is attached to the opposed portion, and a convex part that laterally protrudes from the opposed portion.

* * * * *